US010753536B2

(12) United States Patent
Berkebile et al.

(10) Patent No.: US 10,753,536 B2
(45) Date of Patent: Aug. 25, 2020

(54) DETECTING AND PREDICTING MECHANICAL FAILURE DUE TO LUBRICATION LOSS IN MACHINES AND MOVABLE COMPONENTS

(71) Applicant: U.S. Army Research Laboratory ATTN: RDRL-LOC-I, Adelphi, MD (US)

(72) Inventors: Stephen P. Berkebile, Havre de Grace, MD (US); Kevin C. Radil, Brunswick, OH (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 215 days.

(21) Appl. No.: 15/846,347

(22) Filed: Dec. 19, 2017

(65) Prior Publication Data

US 2019/0186690 A1 Jun. 20, 2019

(51) Int. Cl.
*F16N 29/04* (2006.01)
*F16H 57/04* (2010.01)
*G07C 5/08* (2006.01)
*B64C 27/00* (2006.01)

(52) U.S. Cl.
CPC ......... *F16N 29/04* (2013.01); *F16H 57/0449* (2013.01); *G07C 5/0808* (2013.01); *G07C 5/0816* (2013.01); *B64C 27/006* (2013.01)

(58) Field of Classification Search
CPC .. F16N 29/04; F16N 2210/12; F16N 2260/02; F16N 2210/08; F16N 2260/06; G07C 5/0816; G07C 5/0808; F16H 57/0449; B64C 27/006; B64C 27/12; B64D 2045/0085

See application file for complete search history.

(56) References Cited

U.S. PATENT DOCUMENTS

| 5,599,358 | A | * | 2/1997 | Giavazzi | C10L 1/1802 44/388 |
| 9,776,155 | B1 | * | 10/2017 | Mueller | B01J 8/0285 |
| 2007/0234739 | A1 | * | 10/2007 | Delaloye | F01D 19/00 60/786 |
| 2010/0158717 | A1 | * | 6/2010 | Vogt | F04B 25/02 417/401 |

(Continued)

*Primary Examiner* — Masud Ahmed
(74) *Attorney, Agent, or Firm* — Alan I. Kalb

(57) ABSTRACT

Detecting the occurrence of loss of effective lubrication in high-speed machinery components is provided. The imminent catastrophic failure may be predicted when torque or power transfer is lost. An estimate of when failure will likely occur throughout the operation of the machinery may be determined as well as the damage state after the liquid lubrication supply has ended or becomes inadequate to lubricate the machinery components effectively. By monitoring the concentration of gas species and the rate of change in concentration of the gas in the gearbox or machinery enclosure after the supply of the primary lubricant ends, determinations may be made about the time to failure and the damage state. The determinations may be based on thermomechanical and chemical processes, on measurement of a baseline system, or by setting a threshold of expected change in gas concentration. These determinations may be transmitted for further decision making and response.

20 Claims, 8 Drawing Sheets

(56) References Cited

U.S. PATENT DOCUMENTS

| | | | |
|---|---|---|---|
| 2015/0100180 A1* | 4/2015 | Oyori | F01D 15/10 |
| | | | 701/3 |
| 2015/0129361 A1* | 5/2015 | Hodgkinson | G01N 33/2888 |
| | | | 184/6.4 |
| 2016/0311527 A1* | 10/2016 | Poster | B64C 27/12 |
| 2019/0063678 A1* | 2/2019 | Ganiger | F01D 25/18 |
| 2019/0162687 A1* | 5/2019 | Best | G01N 27/045 |

* cited by examiner

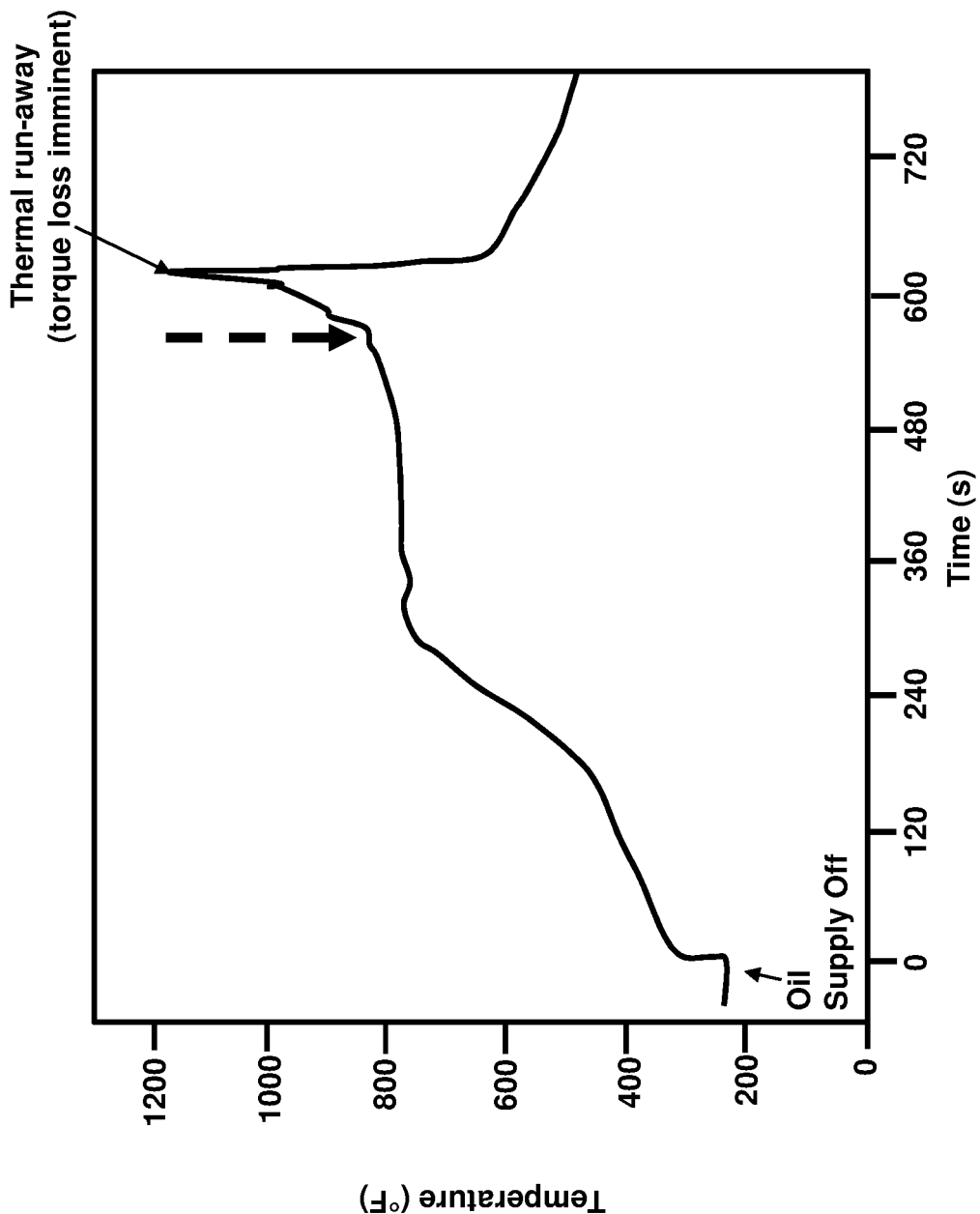

DETECTING AND PREDICTING MECHANICAL FAILURE DUE TO LUBRICATION LOSS IN MACHINES AND MOVABLE COMPONENTS

GOVERNMENT INTEREST

The embodiments described herein may be manufactured, used, and/or licensed by or for the United States Government without the payment of royalties thereon.

BACKGROUND

Technical Field

The embodiments herein generally relate to monitoring techniques, and more particularly to monitoring lubrication loss in machines and other components.

Description of the Related Art

There are a number of sensors that are part of the lubrication system that could act as possible indicators for loss-of-lubrication in a rotorcraft gearbox, but their limited functionality generally makes them unable to provide the detailed information required to estimate machine operating life until total failure nor a gearbox's health during the event. For example, initial detection of lubricant loss in a gearbox typically is by the oil pressure sensor for pressurized systems and the signal is monitored in the cockpit. Unpressurized systems, however, often are not afforded an indicator beyond a sight glass, which cannot be monitored in many situations, or a temperature measurement, which may not provide a timely warning. When the lubrication system losses pressure the pilot of the aircraft receives a warning that a problem has occurred, but it does not indicate the severity of the event or how long the gearbox is expected to function. The temperature of the oil sump is collected and usually transmitted to the cockpit, but a loss of the lubricant renders this temperature meaningless until the housing to which it is attached increases in temperature, perhaps after the gearbox has already failed. Attaching temperature sensors to the gearbox housing could provide some useful information on the health of the gearbox, however, this does not provide a real-time approach since there would be a delay equal to the time it takes for the heat generated at the failing gear and bearing contacts to be transmitted to the housing.

In another method, sensors on the airframe and engine continuously collect vibrations through the health monitoring system. If any vibration reaches a critical level, the pilot is trained to safely land the aircraft. Using vibration measurements as an indicator for a loss-of-lubrication event in the machinery may result in a late report to the operator. The damage must be sufficient to produce vibrations that are above the normal spatial operational envelope surrounding the machinery. During a loss-of-lubrication event, it's possible that the level of vibrations may remain below the threshold of detection until reaching complete failure where it might occur rapidly or in an unpredictable fashion. Even if the vibrations were used as an indicator for loss-of-lubrication, the vibration magnitude that can be measured constituting failure may occur very near the end of the failure process and not provide sufficient warning. The converse may also occur, with the vibrations increasing rapidly at an early stage where the gearbox may operate safely for an extended period before failure, but then not increasing further when failure is imminent.

Acoustic emission can measure the onset of loss-of-lubrication when the surfaces of machinery are no longer fully separated by the liquid lubricant but begin to experience contact between asperities between the solid surfaces, and eventually end in full metal-to-metal contact. Acoustic emission methods rely on sensors in direct contact with the machinery under observation. The intensity and frequency of acoustic emissions can also indicate the severity of the damage in real-time, perhaps even predicting when failure will occur. However, the acoustic emissions associated with the loss-of-lubricant event must be identified and measured over a background noise of insignificant acoustic emissions, which can make an accurate measurement difficult.

Accordingly, loss-of-lubrication in high speed machinery is typically detected by the sensors that measure oil level/pressure, vibrations, and/or acoustic emission. A drop in the oil level gives an indication that lubrication has been lost, and loss of oil pressure indicates that the pressurized oil system has malfunctioned or lost lubricant supply. This information indicates to an operator that an emergency situation has occurred, and machinery damage or failure is probably imminent.

SUMMARY

In view of the foregoing, an embodiment herein provides a method of detecting and predicting mechanical failure of movable components, the method comprising setting a predefined threshold gas concentration level in a substantially enclosed machine comprising a moveable component subjected to a loss-of-lubrication event capable of causing mechanical wear and failure, wherein the predefined threshold gas concentration level indicates a loss-of-lubrication to the moveable component below a predefined acceptable level of lubrication; detecting a gas concentration level in the substantially enclosed machine subjected to a loss-of-lubrication event; comparing the detected gas concentration level to the predefined threshold gas concentration level; and signaling when the detected gas concentration level is less than the predefined threshold gas concentration level.

The method may comprise predicting when mechanical failure of the movable component will occur based on the comparing of the detected gas concentration level to the predefined threshold gas concentration level. The method may comprise assessing a current state of mechanical damage of the moveable component based on the comparing of the detected gas concentration level to the predefined threshold gas concentration level. The gas concentration level may comprise a concentration of oxygen in the substantially enclosed machine. The gas concentration level may comprise a concentration of carbon dioxide in the substantially enclosed machine. The method may comprise correlating a level of mechanical failure of the movable component to the detected gas concentration level. The method may comprise calculating a rate of change of the gas concentration level in the substantially enclosed machine during operation of the movable component.

The method may comprise setting a predefined threshold rate of change of the gas concentration level in the substantially enclosed machine due to the loss-of-lubrication event capable of causing mechanical wear and failure of the movable component; and comparing the calculated rate of change of the gas concentration level to the predefined threshold rate of change of the gas concentration level. The method may comprise calculating a ratio of gas levels in the substantially enclosed machine; calculating a rate of change of the ratio of gas levels in the substantially enclosed machine during operation of the movable component; comparing the ratio and the rate of change of the ratio to a previously measured ratio of gas levels in the substantially enclosed machine and a previously measured rate of change of the ratio of gas levels in the substantially enclosed machine during operation of the movable component; and predicting a time until mechanical failure of the movable component based on the compared ratio and the rate of change of the ratio.

Another embodiment provides a system for detecting and predicting mechanical failure of movable components, the system comprising a memory device to store a predefined threshold gas concentration level of inside a substantially enclosed machine comprising a moveable component subjected to a loss-of-lubrication event capable of causing mechanical wear and failure, wherein the predefined threshold gas concentration level indicates a loss-of-lubrication to the moveable component below a predefined acceptable level of lubrication; a sensor to detect a gas concentration level in the substantially enclosed machine subjected to a loss-of-lubrication event; a processor to compare the detected gas concentration level to the predefined threshold gas concentration level; and a signal generator to transmit a signal when the detected gas concentration level is less than the predefined threshold gas concentration level.

The processor may predict when mechanical failure of the movable component will occur based on the comparing of the detected gas concentration level to the predefined threshold gas concentration level. The processor may assess a current state of mechanical damage of the moveable component based on the comparing of the detected gas concentration level to the predefined threshold gas concentration level. The gas concentration level may comprise a concentration of oxygen in the substantially enclosed machine. The gas concentration level may comprise a concentration of carbon dioxide in the substantially enclosed machine. The processor may correlate a level of mechanical failure of the movable component to the detected gas concentration level.

The processor may calculate a rate of change of the gas concentration level in the substantially enclosed machine during operation of the movable component. The processor may set a predefined threshold rate of change of the gas concentration level in the substantially enclosed machine due to the loss-of-lubrication event capable of causing mechanical wear and failure of the movable component; and compare the calculated rate of change of the gas concentration level to the predefined threshold rate of change of the gas concentration level.

The processor may calculate a ratio of gas levels in the substantially enclosed machine; calculate a rate of change of the ratio of gas levels in the substantially enclosed machine during operation of the movable component; compare the ratio and the rate of change of the ratio to a previously measured ratio of gas levels in the substantially enclosed machine and a previously measured rate of change of the ratio of gas levels in the substantially enclosed machine during operation of the movable component; and predict a time until mechanical failure of the movable component based on the compared ratio and the rate of change of the ratio. The system may comprise a control unit to receive the signal from the signal generator, wherein the control unit is to perform corrective action to prevent mechanical failure of the movable component. The system may comprise a display device to display the state of health or existence of danger due to a loss-of-lubrication of the movable component as well as a progression of the mechanical wear of the movable component.

The embodiments herein provide for gas monitoring within a gearbox or other machinery enclosure to predict time to failure over a large period of time during the failure process, which may also provide an indication of how rapidly the failure process is progressing. The measurement of oxygen and carbon dioxide levels within the machinery enclosure during a loss-of-lubrication event under controlled conditions may provide a baseline for monitoring the health state of the machinery components and whether failure is imminent during less controlled failures in which residual lubricant is maintained or in complex gear boxes with multistate failure scenarios.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 2D is a graph illustrating the temperature inside a gearbox for gear loss-of-lubrication test for sample P4, according to an example;

DETAILED DESCRIPTION

Figure 1:
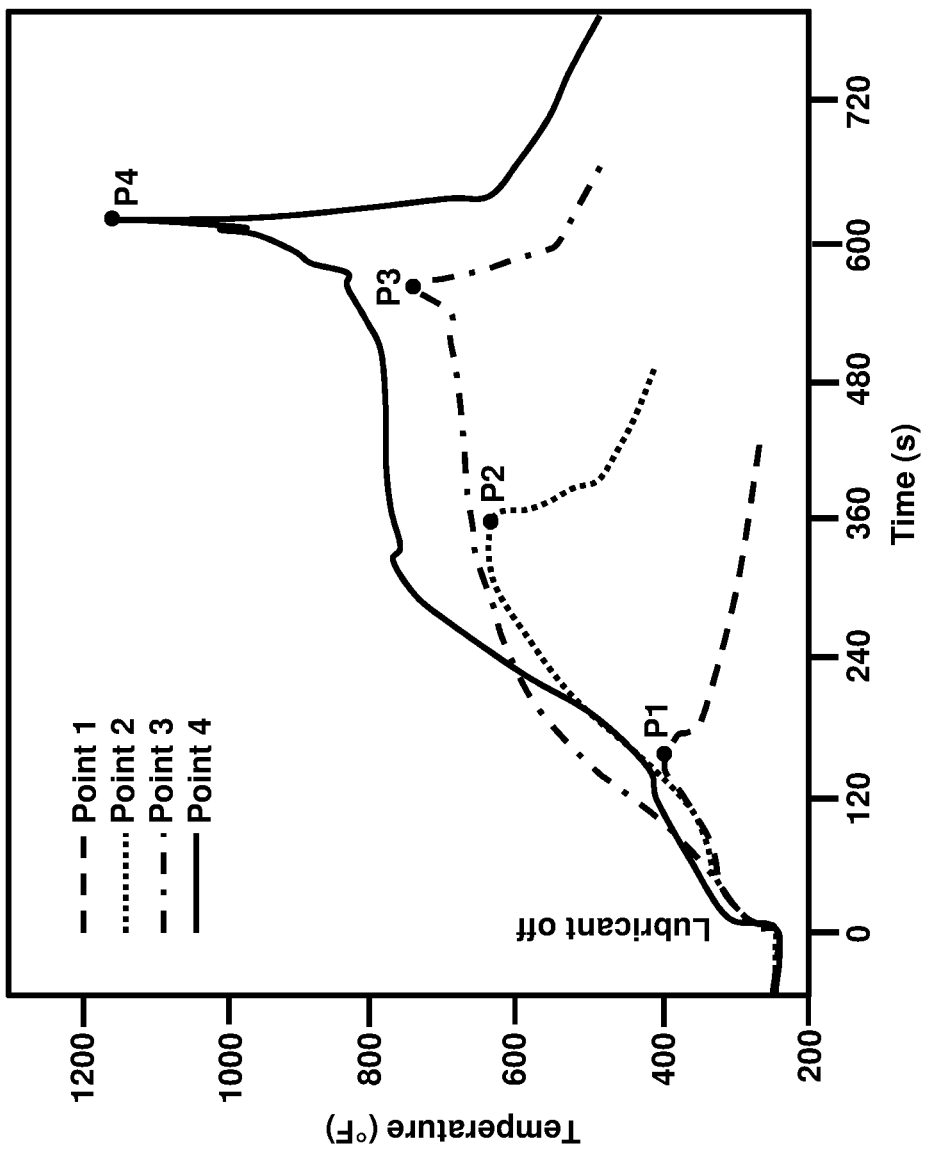
FIG. 1 is a graph illustrating the progression of failure in an experimental set of gears after loss-of-lubrication, according to an example.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein provide a technique to indicate to an operator or to an automated system control unit that a situation of loss-of-lubrication has occurred in high speed gears, gearbox, or machinery, and to report on the time that is estimated until catastrophic failure occurs, and to report if catastrophic failure is imminent. The embodiments herein provide a technique to detect and track the failure progression of gears in real-time during a loss-of-lubrication event, and to estimate when total failure (e.g., loss of transmitted power) will occur. Certain gas species in a gearbox, and in other machinery enclosures, change in concentration during a loss-of-oil event but before the thermomechanical and chemical processes leading to the loss of power transfer are complete. By monitoring the concentration change of these gases in real-time, the health of the gears is continually known and the time to failure may be predicted. For aircraft, implementation of the embodiments herein may provide the aircraft operator with the necessary information to make a decision on whether an immediate landing is required or if there is time to search for a safer landing area. Referring now to the drawings, and more particularly to FIGS. 1 through 5, where similar reference characters denote corresponding features consistently throughout the figures, there are shown exemplary embodiments.

For ease of explanation, the embodiments herein are described with reference to gearboxes and gears, as an example. However, the embodiments herein are applicable to other types of devices and machinery, and accordingly the embodiments herein are not limited to the examples of gears and gearboxes. The embodiments herein utilize a sensor 10 (shown in FIG. 5) to detect or monitor the gas content of a gearbox along with the temperature at the gear mesh. A processor 20 (shown in FIG. 5) is used to calculate the time to total gear failure based on the readings supplied by the sensor 10.

As shown in FIG. 1, the mesh temperature as a function of time is shown for four example experimental sets of gears after the source of lubrication is shut off at time t=0 s and lubricant is allowed to drain from the gearbox. Each set of gears in the experiment is operated to various stages of failure as indicated by P1, P2, P3, and P4, at which point the experimental tests are terminated in order to inspect the gears. In the experiment, the gears were 3.5 inches and with a pitch of 8 and comprising steel, and were rotated at 10,000 rpm. While steel gears were used in the experiment, any metal-metal or steel-ceramic contacts that enter an extended oxidative wear mode may be used in accordance with the embodiments herein. In the experimental tests, a HPR-20 R&D atmospheric sampling residual gas analyzer, available from Hiden Analytical, Warrington, United Kingdom, was used to detect and measure gas levels. The gear temperature increased on its own due to frictional heating from lack of adequate lubrication. P4 shows a rapid rise towards the end of the test, which indicates that the gears are undergoing a situation of thermal run-away that leads to total failure, as indicated by other gear sets that were operated to full torque loss. As the gears wear down, a process of oxidative wear occurs increasingly across the gear tooth face, followed by adhesion and plastic deformation shortly before and during thermal run-away. P1 displays the beginning of oxidative wear, P2 shows a situation in which the gear tooth surface is fully under oxidative wear, P3 shows the start of adhesion and plastic deformation in some regions of the front and back faces of the gear tooth, and P4 indicates the gear tooth s largely deformed through adhesion and plastic deformation with little evidence of oxidation.

Figure 2A:
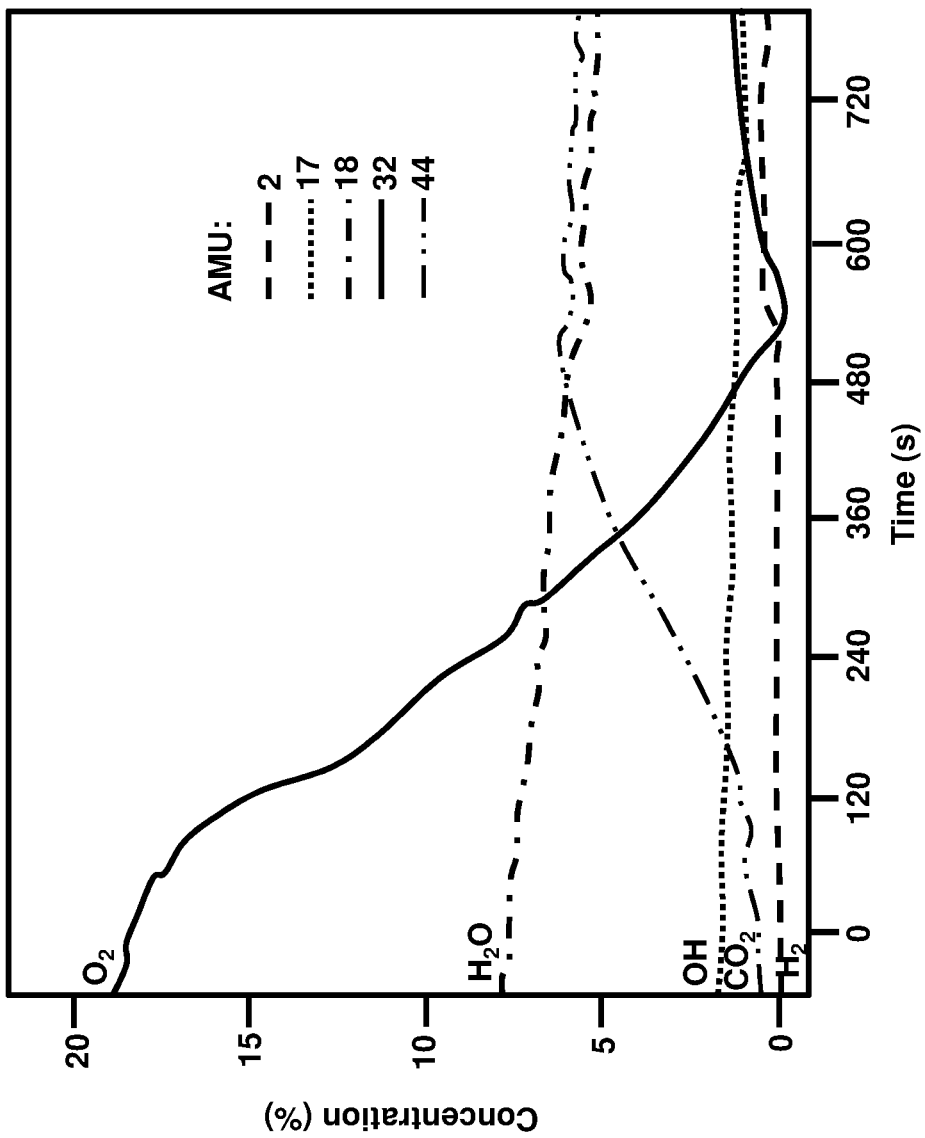
FIG. 2A is a graph illustrating the gas evolution inside a gearbox for gear loss-of-lubrication test for sample P3, according to an example.
Figure 2B:
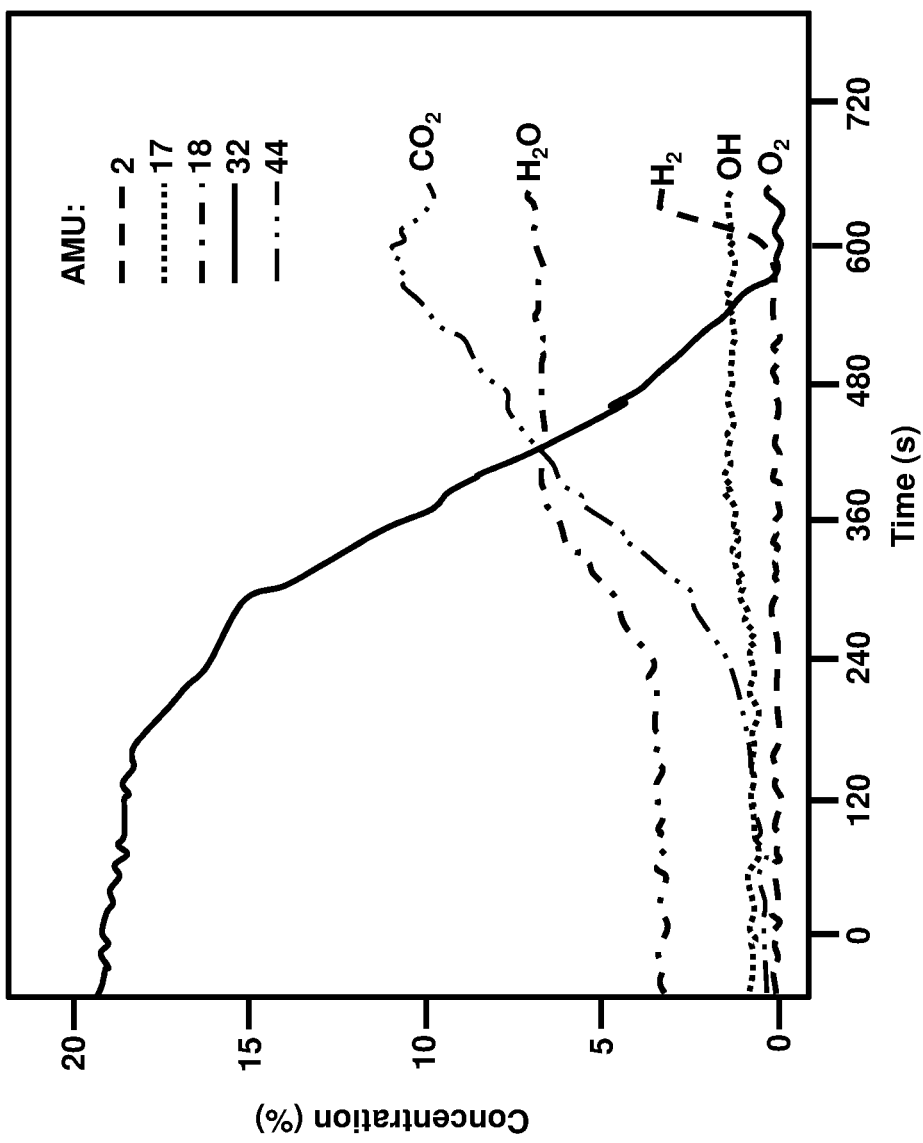
FIG. 2B is a graph illustrating the gas evolution inside a gearbox for gear loss-of-lubrication test for sample P4, according to an example.
Figure 2C:
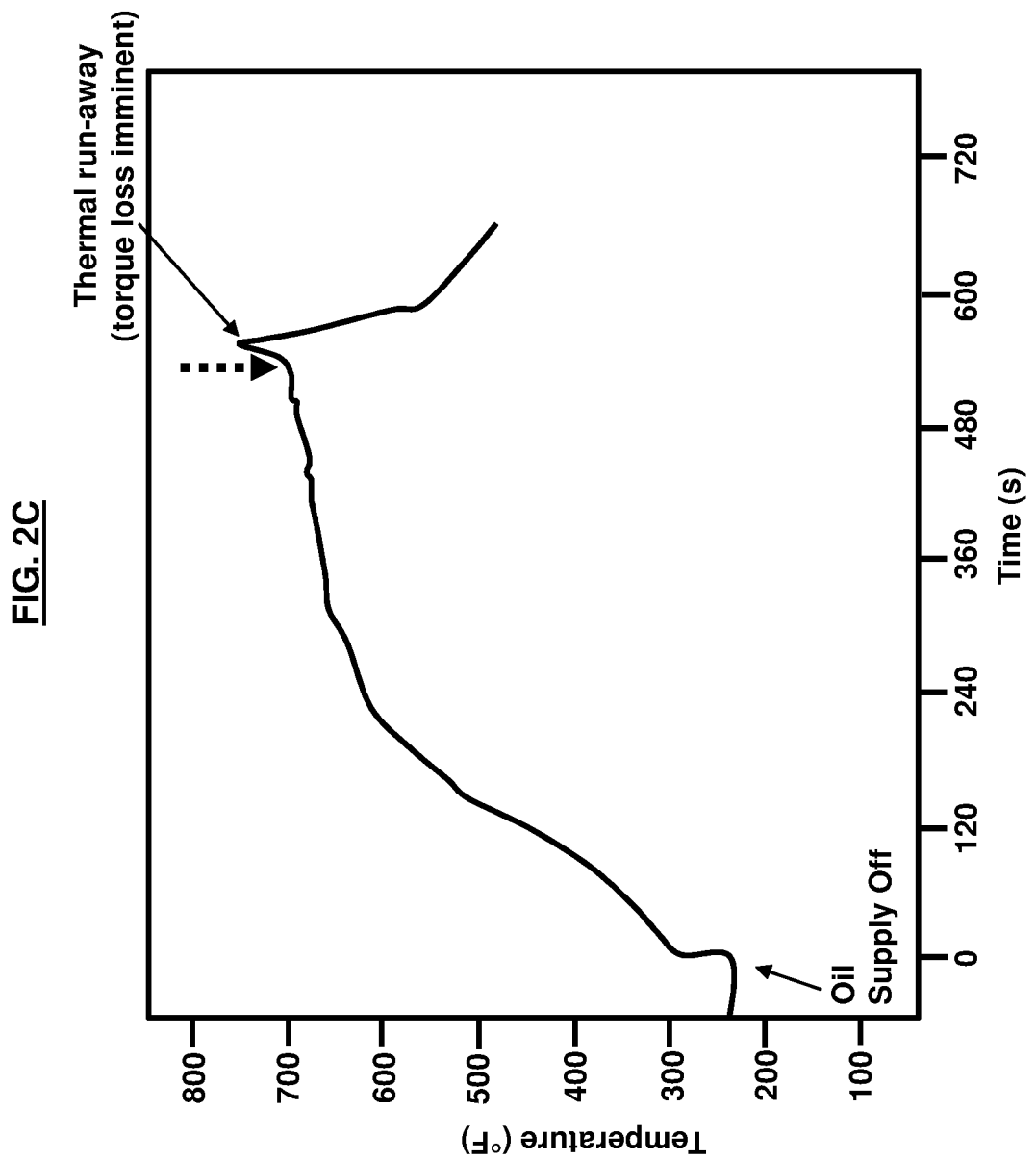
FIG. 2C is a graph illustrating the temperature inside a gearbox for gear loss-of-lubrication test for sample P3, according to an example.

During the tests of P3 and P4, the air inside the gearbox was analyzed using a quadrupole mass spectrometer configured for sampling gas at atmospheric pressure through a heated capillary and differential pumping system. Gear mesh temperatures were collected once per second and gas concentrations every 6.5 seconds. FIG. 2A and FIG. 2B display the gas concentrations for the two tests and FIG. 2C and FIG. 2D display the mesh temperatures inside the gearbox. Data for P3 is shown in FIG. 2A and FIG. 2C, and data for P4 is shown in FIG. 2B and FIG. 2D. The mesh temperature can be seen to initially increase rapidly for a few seconds, after which a first inflection point is reached, and the rate of increase becomes slower. At approximately 40 seconds for P3 or 130 seconds for P4, a second inflection point is reached where the rate of temperature increase becomes larger. After a third inflection point (e.g., P3 at 240 seconds and P4 at 300 seconds), the rate of increase slows significantly and nearly flattens out. A fourth inflection point is reached at approximately 540 seconds for P3 or 560 seconds at P4 where thermal run-away occurs, and the temperature rises dramatically just before torque loss occurs. For both experimental gear sets, the oxygen pressure within the mass spectrometer, which is proportional to the oxygen level in the gear box, can be seen to drop with an initially increasing rate and then a linear rate until it reaches a pressure two orders of magnitude below the initial level. The first decrease in oxygen corresponds roughly to the larger increase in temperature after the second inflection point. The linear region of oxygen depletion occurs after the third inflection point when the temperature is relatively stable. Once the oxygen pressure has decreased three orders of magnitude, the fourth inflection point is reached, and thermal run-away occurs. The partial pressure of carbon dioxide also changes during the failure process. It initially begins increasing slowly as soon as the lubrication supply is shut off, then it increases mostly linearly during the linear portion of the oxygen decrease.

The embodiments herein provide for various methods to detect the loss-of-lubrication. In a method according to a first embodiment, the amount of oxygen alone is used to detect the loss-of-lubrication. When a high speed mechanical contact is fully lubricated, the surface is largely protected from damage through hydrodynamic or elastohydrodynamic lubrication, in which a thin film of liquid lubricant separates and protects two solid surfaces from contact. If the surfaces come into contact due to inadequate lubrication, their high speed causes them to undergo rapid frictional heating, which results in oxidative wear for steel and many other metals. A decrease in the oxygen level indicates that oxidative wear has begun due to an interruption in the lubricant supply. Based upon a measured or sensed decrease in oxygen, a signal may be given that the lubricant supply has been interrupted and a loss-of-lubrication situation is occurring in the gearbox or enclosed machinery. The rise in the carbon dioxide level may also indicate that the same situation is occurring, although carbon dioxide may arise from the carburization layer in the steel, thus it may only be applicable to carbon containing alloys.

Figure 3A:
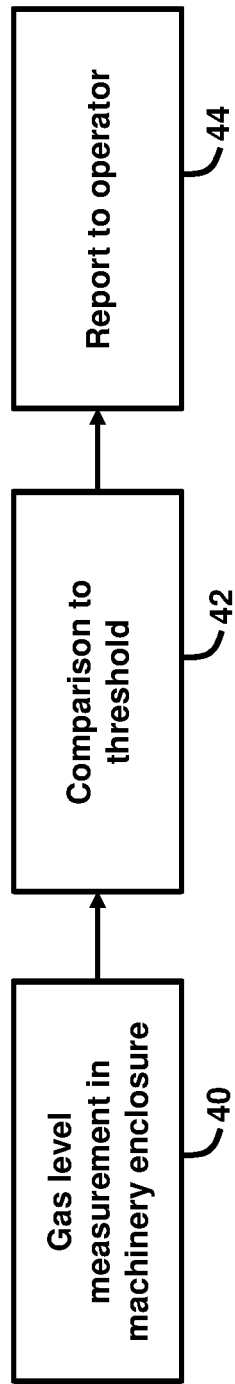
FIG. 3A is a flow diagram illustrating a method, according to an example.

FIG. 3A illustrates a method according to a first embodiment. In block 40, the gas level (e.g., oxygen or carbon dioxide) is measured inside of the machine enclosure and any changes to the gas level from a previous reading is observed. In block 42, an appropriate threshold gas level (e.g., oxygen or carbon dioxide) is established in the machinery enclosure, which represents a situation of inadequate lubrication or a loss-of-lubrication. A comparison of the gas level occurs against the threshold gas level and the decrease or increase in the comparative gas level is calculated. In block 44, a signal is transmitted to a machine operator that a situation of inadequate lubrication or a loss-of-lubrication has occurred. Such a signal may include an audio signal output through a speaker or a visual signal displayed on a user interface screen or displayed as a light (e.g., light bulb, etc.).

In a method according to a second embodiment, the concentration of oxygen and its rate of decrease may be used to determine the state of damage, time to catastrophic failure, and imminence of failure, if further information has been gathered on an equivalent or identical mechanical system in a loss-of-lubrication test. The rate of decrease in oxygen corresponds to the different rates of increase in temperature, and hence to the different processes of damage that are occurring. The initially increasing rate of oxygen depletion corresponds to an expanding zone of oxidative wear, while the linear portion corresponds to a steady-state of oxidative wear. The linearity of the decrease in oxygen before thermal run-away lends itself to determining the time that its level will approach zero, which is when failure occurs. It can be seen for P3 and P4 that the slope of decrease is somewhat different, however its intercept with a pressure of zero corresponds to the beginning of thermal run-away. Alternatively, the concentration of carbon dioxide may be monitored to make similar predictions.

Figure 3B:
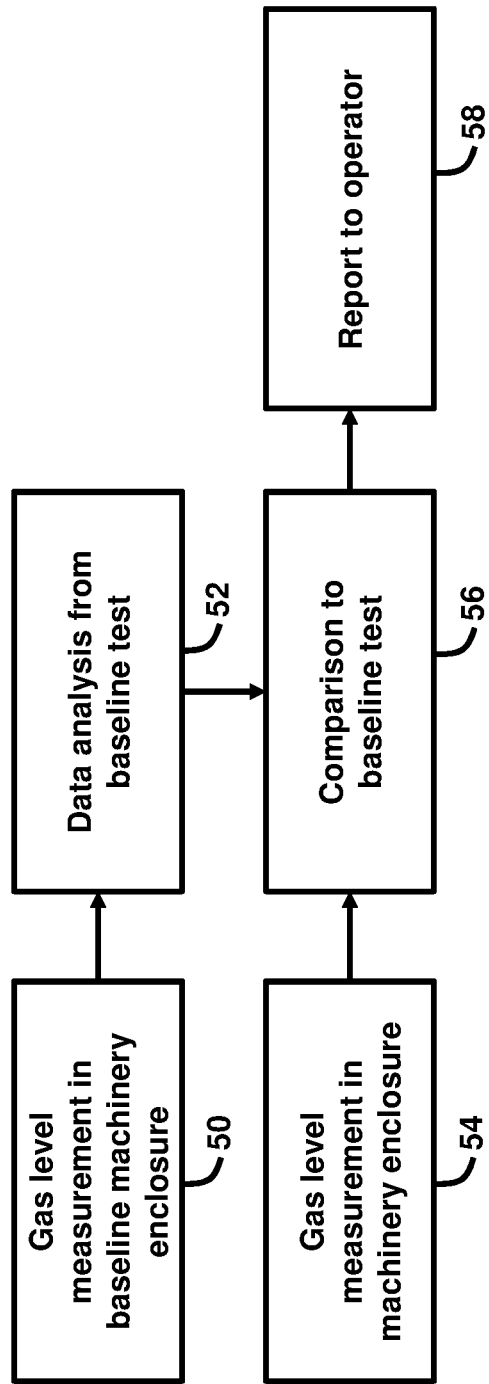
FIG. 3B is a flow diagram illustrating another method, according to an example.

FIG. 3B illustrates a method according to a second embodiment. In block 50, the gas level (e.g., oxygen or carbon dioxide) is measured inside of a baseline machine enclosure under controlled conditions of lubrication loss and any changes are recorded. The machinery should be identical or equivalent to the intended machinery of use. Optionally, the level of the state of damage can be determined in a series of baseline tests of the machinery while monitoring the gas level (e.g., oxygen or carbon dioxide), and the damage is correlated to the gas level. In block 52, optionally, the damage state of the components may be determined in a series of baseline tests of the machinery while monitoring the gas level (e.g., oxygen or carbon dioxide) inside. The damage state may be correlated to the measured gas level. It is also determined whether the gas level has reached a catastrophic failure level and the rate of change in the gas level is measured throughout the operation of the machinery during a condition of loss-of-lubrication.

In block 54, the gas level (e.g., oxygen or carbon dioxide) is measured inside of the machinery enclosure and any detected changes in the measurement of the gas level and rate of change of the gas level are calculated and stored. In block 56, the gas level (e.g., oxygen or carbon dioxide) and its rate of change are compared with the previously recorded levels from the baseline test from block 52. The time to catastrophic failure is determined from the measured gas level (e.g., oxygen or carbon dioxide) and its rate of change. Optionally, the gas level (e.g., oxygen or carbon dioxide) and its rate of change are compared to known correlations to the damage state measurements.

In block 58, the results of the comparison measurements may be reported to the machine operator or to an automated system control unit by transmitting a signal, and may include the estimated time that inadequate lubrication or loss-of-lubrication will lead to catastrophic failure based on the measured gas level (e.g., oxygen or carbon dioxide) in the machinery enclosure. Optionally, a signal may be transmitted reflecting the state of damage of the machinery based on the gas level (e.g., oxygen or carbon dioxide), which may be reported to the machine operator or automated system control unit. Such a signal(s) may include an audio signal output through a speaker or a visual signal displayed on a user interface screen or displayed as a light (e.g., light bulb, etc.).

Figure 4:
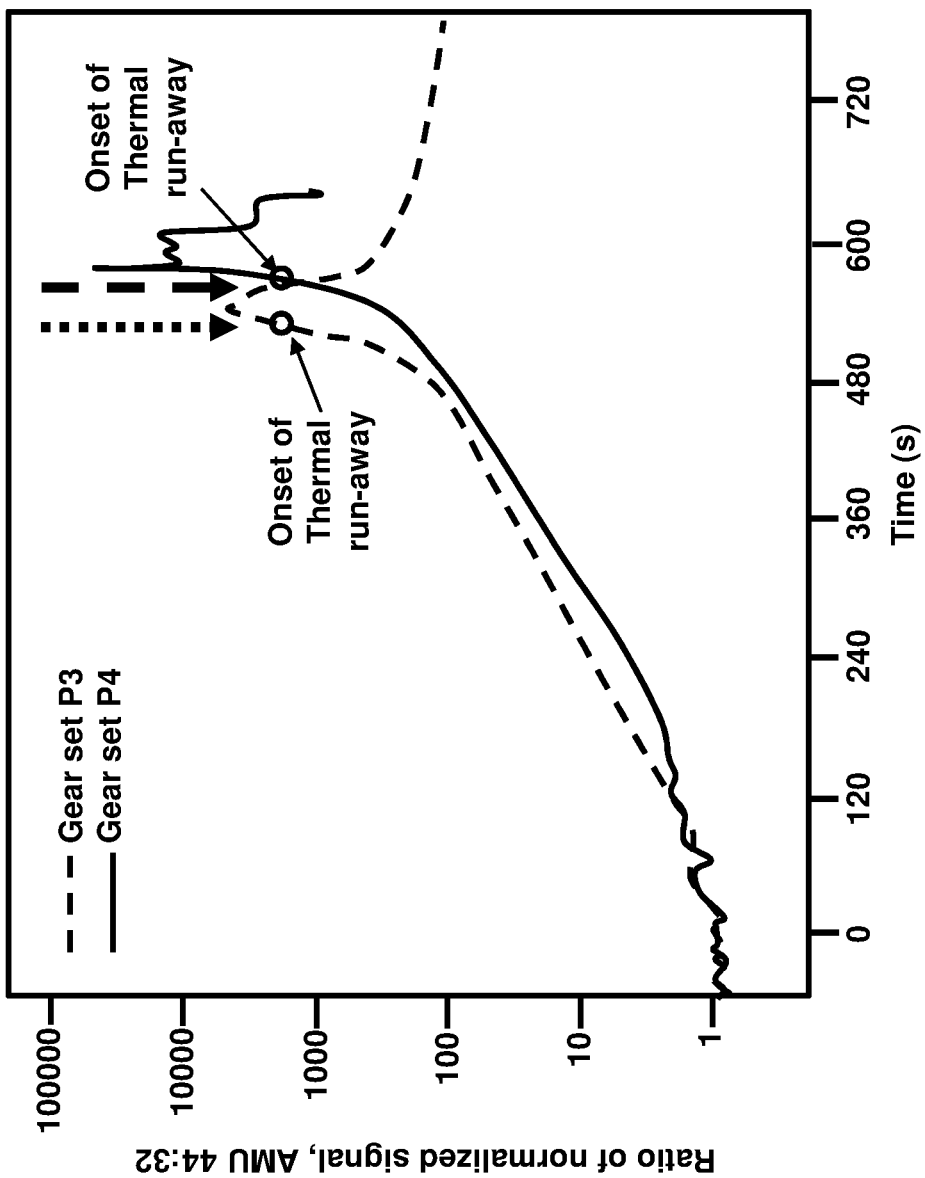
FIG. 4 is a graph illustration ratio curves of $CO_2:O_2$ for experimental gear sets P3 and P4, according to an example.

In a method according to a third embodiment, the ratio of concentrations of oxygen and carbon dioxide may be used to accurately predict the time to catastrophic failure and imminence of catastrophic failure. FIG. 4 shows the ratio of the normalized partial pressures $CO_2:O_2$ (masses 44 and 32 Atomic Mass Units, AMU) for experimental gear sets P3 and P4. The partial pressures are normalized to their initial value before lubrication is stopped. As the data shows, after an initial slower increase, the ratios for both experimental gear sets increase approximately linearly until an inflection occurs and the increase is greater.

This inflection occurs approximately 20-40 seconds before the onset of thermal run-away, which directly precludes full loss of torque. According to the embodiments herein, the inflection is used as a diagnostic warning that failure is imminent. Further, the ratio at which thermal run-away begins to occur is approximately the same for both experimental sets of gears P3 and P4 (the dotted and dashed arrows in FIG. 4 correspond to the dotted and dashed arrows in FIGS. 2C and 2D). The ratio at which thermal run-away occurs is used, according to the embodiments herein, as a measure of when torque loss is imminent. This ratio that is measured at any point gives an indication of how far the system is from torque loss more accurately than the concentrations of oxygen or carbon dioxide alone. Again, using the carbon dioxide concentration may be applicable for alloys containing carbon.

FIG. 3B also illustrates a method according to a third embodiment. In block 50, the gas level (e.g., oxygen or carbon dioxide) is measured inside of a baseline machine enclosure under controlled conditions of lubrication loss and any changes are recorded. The machinery should be identical or equivalent to the intended machinery of use. Optionally, the level of the state of damage can be determined in a series of baseline tests of the machinery while monitoring the gas level (e.g., oxygen or carbon dioxide), and the damage is correlated to the gas level. In block 52, optionally, the damage state of the components may be determined in a series of baseline tests of the machinery while monitoring the gas level (e.g., oxygen or carbon dioxide) inside. The damage state may be correlated to the measured gas level. The ratio of normalized gas levels may then be calculated, and the ratio of the normalized gas levels reached at a catastrophic failure level and the rate of change in the gas level throughout the operation of the machinery during a condition of loss-of-lubrication is determined.

In block 54, the gas level (e.g., oxygen or carbon dioxide) is measured inside of the machinery enclosure and the ratio of the gas levels are calculated and stored. In block 56, the ratio and its rate of change are compared with the previously recorded levels from the baseline test from block 52. The time to catastrophic failure is determined from the calculated ratio and its rate of change. Optionally, the ratio and its rate of change are compared to known correlations to the damage state measurements.

In block 58, the results of the comparison measurements may be reported to the machine operator or to an automated system control unit by transmitting a signal, and may include the estimated time that inadequate lubrication or loss-of-lubrication will lead to catastrophic failure based on the calculated ratio. Optionally, a signal may be transmitted reflecting the state of damage of the machinery based on calculated ratio, which may be reported to the machine operator or automated system control unit. Such a signal(s) may include an audio signal output through a speaker or a visual signal displayed on a user interface screen or displayed as a light (e.g., light bulb, etc.). Optionally, the state of damage of the machinery based on the calculated ratio may be reported (e.g., signal transmission) to a machine operator or automated control system unit.

As the data results of the experimental tests demonstrate, as shown in FIGS. 2A through 2D and FIG. 4, during operation of each experimental gear set after the primary lubricant (i.e., oil supply) ends, the oxygen level in the machinery enclosure decreases initially at an increasing rate, and then at a constant rate by two to three orders of magnitude until torque loss occurs. The carbon dioxide level increases in concentration at an initially increasing rate, and then at a steady rate by approximately one order of magnitude, and then levels off as torque loss occurs. The decrease in the amount of oxygen and the increase in carbon dioxide were demonstrated to be of similar magnitude as well as the trend for each of the two tests using the P3 and P4 samples throughout the process of failure until they were stopped at or near torque loss. The ratios of normalized oxygen to carbon dioxide partial pressure was similar between the two tests, and the onset of the thermal run-away just prior to torque loss occurred as the same $CO_2:O_2$ ratio.

According to the embodiments herein, rather than using large laboratory mass spectrometer systems, compact gas sensors may be utilized instead. Moreover, the embodiments herein may be utilized as a threshold device such that an electrical output from a sensor may trigger an indicator at some voltage or current level upon sensing the gas level.

Figure 5:
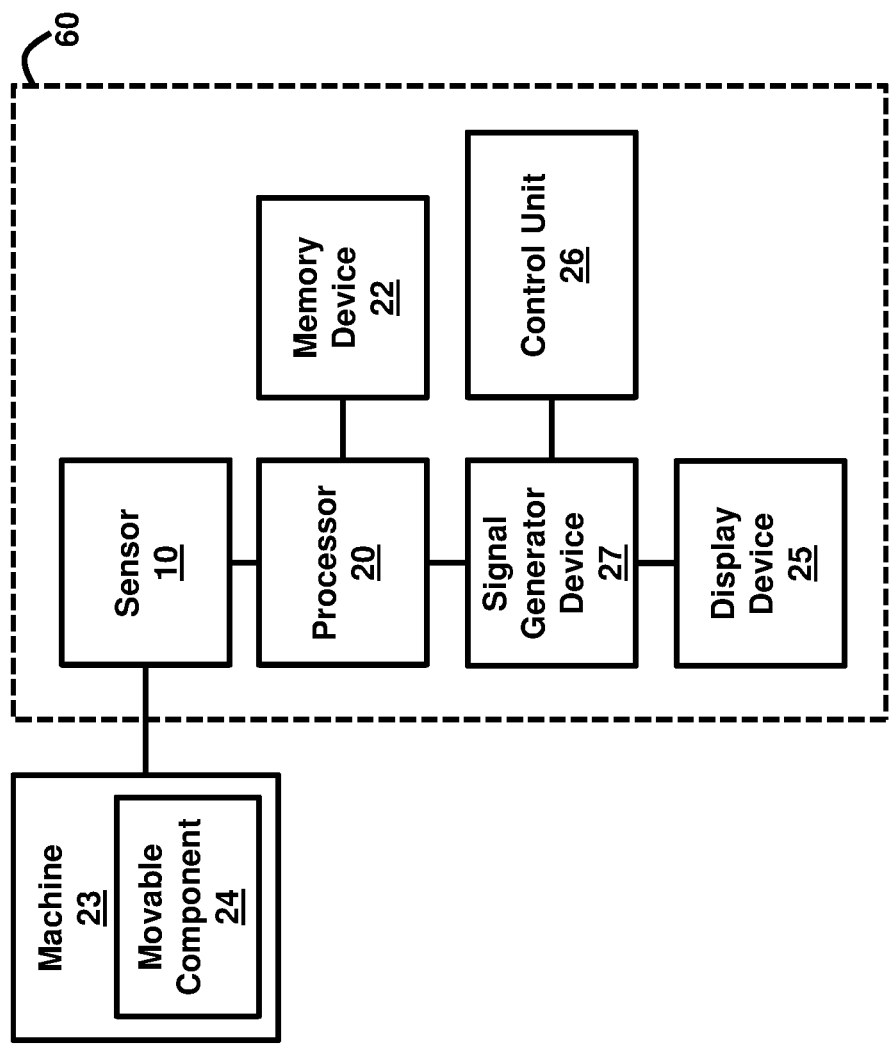
FIG. 5 is a system block diagram, according to an example.

FIG. 5, with reference to FIGS. 1 through 4, illustrates a system 60 according to an embodiment herein, wherein the system 60 comprises at least one compact gas sensor 10 configured to monitor the gas level (e.g., oxygen and carbon dioxide) concentration of a substantially enclosed machine 23, in real-time. A microprocessor 20 may be communicatively coupled to the sensor 10, and is configured for decision making by comparing the gas levels to reference/baseline levels, which are stored in a memory device 22. A display device 25 is configured to display the state of health or existence of danger due to a loss-of-lubrication of the machinery components as well as the progression of damage, time to failure, and the imminence of failure. A signal generator device 27 may be used in accordance with the method of the first embodiment shown in FIG. 3A to send a signal to a machine operator or an automated control unit 26, once the processor 20 determines whether the loss-of-lubrication has occurred in the machine 23 with both pressurized and unpressurized oil supplies. The methods provided by the embodiments herein may be used to detect mechanical failure in a movable component 24 such as a gear, a gearbox, or other components in the machine 23 after a loss-of-lubrication and to predict when total failure of the machine 23 or movable component 24 will occur. By using the gas level (e.g., oxygen and carbon dioxide) concentration, the progression of failure may be determined. By using prior baseline tests of the damage progression on a similar test system, the current extent of damage and the time until total failure may be estimated or predicted from the gas level (e.g., oxygen and carbon dioxide) concentrations, as well as the ratio of the two gases.

According to other examples, the embodiments herein may be used to inform a human pilot or operator of the machinery state when lubrication is lost, as well as to activate an automated emergency lubrication system at specific times when they would be most effective to provide supplemental lubrication to the machinery components. The embodiments herein may also be implemented in open or partially enclosed systems, if the gas level may be measured sufficiently close enough to the mechanical contact of interest. While the descriptions above refer to oxygen and carbon dioxide gases, other gases may be evolved during unlubricated operation of other alloys or ceramics. These gases may likewise provide an indication of the time to failure in systems that do not use steel. Furthermore, the embodiments herein may be utilized in situations where lubrication may still be available to the machinery components, but power throughput has been increased to a level that begins to break through the liquid lubricant layer and causing oxidative wear. Additionally, the embodiments herein may also be utilized in solid lubricated systems when a change in the materials in contact occurs through wear through a coating or solid lubricant layer, or a change in the chemistry of the wear mode occurs.

Predicting the operating life of a set of gears during a loss of lubricant event can prevent catastrophic damage to the aircraft or loss of human life. Gears operating at high speeds without proper lubrication will fail by excessive heating and material degradation. The progression towards failure can last a significant time (e.g., ten minutes or more) until the gears have completely degraded and can no longer transmit power. During this time normal operation of the aircraft can often continue, albeit at lower power levels, until power is lost, after which the gears can no longer fulfill their primary function of mechanical power transfer. For example, in a rotorcraft, this means that the main rotor will no longer provide lift and the pilot must attempt an unpowered autorotation to ground/sea or crash. The embodiments herein detect and track the failure progression of gears in real-time during a loss-of-lubrication event and provide an estimate to the operator of the aircraft, etc. when total failure will occur. The operator can then use the information to determine the best course of action, such as making an emergency landing under normal operating conditions. In non-aviation machinery, uncontrolled destruction could be prevented by shutting down before power transfer is lost.

The process of failure during loss-of-lubrication in high speed gears is complex and progresses through several stages during which the composition of the gas inside the gearbox changes. Once the lubrication supply to the gears is removed, oxygen levels inside the gearbox decreases and the carbon dioxide level increases. The changes in concentration of these gases within the gearbox correspond to the damage progression of the unlubricated gear teeth in a repeatable fashion. By monitoring the concentration of these gases and comparing it to a baseline or the gas ratio, the situation of insufficient lubrication may be detected, and the moment of total failure can be predicted for these sets of gears. The correlation of gas concentration with failure progression may be applied to other gear configurations, geared systems, and high speed sliding mechanical contacts in any container that is sufficiently closed to gas exchange with its surroundings. Since gear failure may not always proceed in a controlled manner, such as if oil is only partially lost, the gas content could also be used to determine the health state of the gears during a situation with insufficient liquid lubrication.

The embodiments herein avoid the necessity of using complex sensing systems using numerous sensors for each specific component in the machinery enclosure by utilizing the gas concentration level of the enclosed machinery compartment. When used in rotorcraft turbomachinery, the embodiments herein may allow an operator to make informed decisions on the various actions available in an emergency situation and reducing the risk in that decision-making process.

Gearboxes on military rotorcraft are required to successfully operate for 30 minutes without oil once the oil pressure light activates. Rotorcraft operating in the field do not always display such longevity due to complex operational conditions thus creating an unpredictable situation for the pilot. Once the problem is known the pilot will typically aim to land the rotorcraft as soon as possible. If the aircraft is in hostile territory, in mountainous terrain, or over a body of water, the pilot may need additional time to reach a safe landing zone. By knowing the time to total failure the pilot will be able to ascertain if the aircraft is capable of reaching the safe landing zone or should be positioned close to the water or ground before control is lost. Additional use may be found in unpressurized gearboxes which currently do not indicate their oil level to the pilot.

The embodiments herein may be utilized in rotorcraft applications, unmanned aerial vehicles, as well as for ground vehicles where a sudden loss in propulsion gearbox power due to loss of lubricant is a concern and could result in the loss of equipment or personnel when warning is not given. Furthermore, the embodiments herein may also be implemented in compressor swashplates, cams and followers, or any system that contains high speed lubricated contacts that transmit mechanical power such as gearboxes on advanced windmills for power generation and other heavy or high-speed machinery such as factory systems, power turbines, etc. For high-speed gear systems, full failure of the gears may be predicted from seconds up to minutes before it occurs, and may be used to monitor the health state during a lubrication loss event. The health state of the machinery components may be transmitted to a machinery operator, aviation vehicle pilot, or automated system for decision making and response.

The embodiments herein use the measurement of the gas level within a gearbox or other machinery enclosure to determine whether loss-of-lubrication has occurred, the state of damage of the machinery, and the time until failure of unlubricated high-speed contacts. For example, the embodiments herein utilize measurements of the concentration of oxygen and carbon dioxide in a gearbox or other machinery enclosure and correlate this to the chemical degradation processes that are occurring due to loss-of-lubrication event, which then provides information on the health state of the machinery components and the amount of damage occurring.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A method of detecting and predicting mechanical failure of movable components, the method comprising:
    setting a predefined threshold gas concentration level in an enclosed machine comprising a moveable component subjected to a loss-of-lubrication event capable of causing mechanical wear and failure, wherein the predefined threshold gas concentration level indicates a loss-of-lubrication to the moveable component below a predefined acceptable level of lubrication;
    detecting a gas concentration level in the enclosed machine subjected to a loss-of-lubrication event;
    comparing the detected gas concentration level to the predefined threshold gas concentration level; and
    signaling when the detected gas concentration level is less than the predefined threshold gas concentration level.

2. The method of claim 1, comprising predicting when mechanical failure of the movable component will occur based on the comparing of the detected gas concentration level to the predefined threshold gas concentration level.

3. The method of claim 1, comprising assessing a current state of mechanical damage of the moveable component based on the comparing of the detected gas concentration level to the predefined threshold gas concentration level.

4. The method of claim 1, wherein the gas concentration level comprises a concentration of oxygen in the enclosed machine.

5. The method of claim 1, wherein the gas concentration level comprises a concentration of carbon dioxide in the enclosed machine.

6. The method of claim 1, comprising correlating a level of mechanical failure of the movable component to the detected gas concentration level.

7. The method of claim 1, comprising calculating a rate of change of the gas concentration level in the enclosed machine during operation of the movable component.

8. The method of claim 7, comprising:
    setting a predefined threshold rate of change of the gas concentration level in the enclosed machine due to the loss-of-lubrication event capable of causing mechanical wear and failure of the movable component; and
    comparing the calculated rate of change of the gas concentration level to the predefined threshold rate of change of the gas concentration level.

9. The method of claim 1, comprising:
    calculating a ratio of gas levels in the enclosed machine;
    calculating a rate of change of the ratio of gas levels in the enclosed machine during operation of the movable component;
    comparing the ratio and the rate of change of the ratio to a previously measured ratio of gas levels in the enclosed machine and a previously measure rate of change of the ratio of gas levels in the enclosed machine during operation of the movable component; and
    predicting a time until mechanical failure of the movable component based on the compared ratio and the rate of change of the ratio.

10. A system for detecting and predicting mechanical failure of movable components, the system comprising:
    a memory device to store a predefined threshold gas concentration level of inside a enclosed machine comprising a moveable component subjected to a loss-of-lubrication event capable of causing mechanical wear and failure, wherein the predefined threshold gas concentration level indicates a loss-of-lubrication to the moveable component below a predefined acceptable level of lubrication;

a sensor to detect a gas concentration level in the enclosed machine subjected to a loss-of-lubrication event;

a processor to compare the detected gas concentration level to the predefined threshold gas concentration level; and a signal generator to transmit a signal when the detected gas concentration level is less than the predefined threshold gas concentration level.

11. The system of claim 10, wherein the processor is to predict when mechanical failure of the movable component will occur based on the comparing of the detected gas concentration level to the predefined threshold gas concentration level.

12. The system of claim 10, wherein the processor is to assess a current state of mechanical damage of the moveable component based on the comparing of the detected gas concentration level to the predefined threshold gas concentration level.

13. The system of claim 10, wherein the gas concentration level comprises a concentration of oxygen in the enclosed machine.

14. The system of claim 10, wherein the gas concentration level comprises a concentration of carbon dioxide in the enclosed machine.

15. The system of claim 10, wherein the processor is to correlate a level of mechanical failure of the movable component to the detected gas concentration level.

16. The system of claim 10, wherein the processor is to calculate a rate of change of the gas concentration level in the enclosed machine during operation of the movable component.

17. The system of claim 16, wherein the processor is to:
set a predefined threshold rate of change of the gas concentration level in the enclosed machine due to the loss-of-lubrication event capable of causing mechanical wear and failure of the movable component; and
compare the calculated rate of change of the gas concentration level to the predefined threshold rate of change of the gas concentration level.

18. The system of claim 10, wherein the processor is to:
calculate a ratio of gas levels in the enclosed machine;
calculate a rate of change of the ratio of gas levels in the substantially enclosed machine during operation of the movable component;
compare the ratio and the rate of change of the ratio to a previously measured ratio of gas levels in the enclosed machine and a previously measure rate of change of the ratio of gas levels in the enclosed machine during operation of the movable component; and
predict a time until mechanical failure of the movable component based on the compared ratio and the rate of change of the ratio.

19. The system of claim 10, comprising a control unit to receive the signal from the signal generator, wherein the control unit is to perform corrective action to prevent mechanical failure of the movable component.

20. The system of claim 10, comprising a display device to display the state of health or existence of danger due to a loss-of-lubrication of the movable component as well as a progression of the mechanical wear of the movable component.

* * * * *